United States Patent Office 3,526,603
Patented Sept. 1, 1970

3,526,603
PROCESS FOR INCREASING PORE VOLUME OF INTERMEDIATE DENSITY SILICA GEL
Ellsworth George Acker, Baltimore, Md., assignor to W. R. Grace & Co., a corporation of Connecticut
No Drawing. Filed Mar. 5, 1968, Ser. No. 710,629
Int. Cl. B01j 11/36; C01b 33/28
U.S. Cl. 252—451    4 Claims

ABSTRACT OF THE DISCLOSURE

An intermediate density silica gel is formed by washing an acid-set hydrogel with a hot ammonia solution. The neutralization of ammonia and removal of soluble impurities with mineral acid prior to drying causes an increase in the pore volume of the intermediate density gel.

---

This invention relates to a method for increasing the pore volume of silica gel and is specifically concerned with a method for increasing the pore volume of intermediate density silica gel.

It is well known that silica gel is a partially dehydrated form of polymerized colloidal silica. Density and surface area characteristics of the silica gels makes these gels useful as selective adsorbents, desiccants, and catalyst supports. Generally, low density gels are characterized by low surface area, as well as high pore volume while high density silica gels possess high surface area and low pore volume. Intermediate density gels generally exhibit low surface area and high pore volume.

Intermediate density gels are of particular use as flatting agents. These agents are incorporated into surface coatings, synthetic leathers, synthetic fabrics and plastics to make their appearance more attractive. Greater flatting efficiency is achieved if intermediate density gels with higher pore volumes are utilized. Methods have been developed to alter the surface characteristics of these gels; to increae the pore volume and at the same time lower the surface area, for example.

It is an object of this invention to provide a method of increasing the pore volume of an intermediate density gel without producing a significant decrease in surface area of the gel. A product is thus formed which meets the requirements of a particular application.

In accordance with this invention, it has been found that neutralization of a base washed hydrogel, i.e. intermediate density gel, prior to drying causes an increase in the pore volume of the intermediate density gel, yet maintains the surface area nearly constant.

The process of this invention is carried out by converting an acid-set silica hydrogel to the intermediate density gel by washing, with a hot ammonia solution, neutralizing the base washed hydrogel with a solution of a suitable acid, washing to remove excess salts and to maintain a desired pH value, drying and finally activating the gel.

Numerous methods for the formation of silica hydrogel have been disclosed e.g., U.S. 1,297,724. Essentially, the silica gel is formed by mixing a sodium silicate solution with a mineral acid and allowing the gel to set under suitable conditions.

When the quantity of acid added to the sodium silicate solution is such that the final pH of the reaction mixture is acidic, the resulting product is considered an acid-set hydrogel. Generally, both reactants are metered separately into a high speed mixer.

The intermediate density gel of this invention is formed by washing the acid-set hydrogel with a hot solution of ammonia. Ammonia is preferred, however it is possible to use a substituted ammonia, i.e. water soluble amine or a substituted ammonium hydroxide, as well as other bases. Although ammonia solutions of various concentrations can be used, it has been found that a pH range of 8 to 10 is more desirable. The temperature of this wash solution usually varies from 40° to 80° C. The washing continues until a desired surface area is obtained, usually about 18–40 hours, preferably 24 hours.

The intermediate density gel formed by this treatment has a low surface area and high pore volume.

According to this invention, the intermediate density gel is then neutralized with a solution of a suitable acid and washed free of electrolytes. A mineral acid or any medium strength acid, which will satisfy the final pH requirements, can ge used. However, in the process of this invention, sulfuric acid is chosen from the available mineral acid such as nitric, phosphoric, or hydrochloric. The concentration of the sulfuric acid can likewise vary, but it has been found that at least about 1% by weight of the acid is generally quite effective.

The intermediate density hydrogel is treated with the sulfuric acid solution until complete neutralization of the ammonia occurs and sufficient acid is added to maintain a pH of 3 or less. After the neutralization step, washing with acidulated water for a short period guarantees that excess salts are removed from the silica gel and that the desired pH range is maintained. In this wash step, the pH of the sulfuric acid wash water is adjusted to about 1.0 to 3.8, preferably 2.5 to 3.0.

The intermediate density silica gel may then be dried by any conventional method. The drying may be accomplished in a forced draft oven at temperatures between 130 and 160° C. with a circulating air flow for a period of 10 to 20 hours. Satisfactory results are obtained in most cases by drying the gel at 150° C. for about 17 hours.

The product is finally finished by activating the gel at temperatures between about 180 and 250° C. for from 2 to 6 hours. The activation period should be such that the total volatiles content is about 2.5%.

Treatment of the silica gel by the process of this invention gives an intermediate density silica gel whose pore volume has increased greatly while its surface area has remained essentially constant.

The invention is further illustrated by the following specific but non-limiting examples.

EXAMPLE I

This example illustrates a method of preparing intermediate density silica gels.

Sodium silicate (22.8% $SiO_2$+7.0% $Na_2O$) and sulfuric acid (25.4% $H_2SO_4$) were pumped at 230 ml./min. and 130 ml./min. respectively into a high speed mixer until sufficient acid was added for 120% neutralization. The resulting 15% silica sol was formed at a pH of 1.5. The reacting solutions were prepared by dilution with deionized water and were delivered into the reaction zone from calibrated separatory funnels.

The silica hydrosol was collected in polyethylene trays and allowed to set to a hydrogel in about 100 minutes at 28° C.

A 2,000 gram portion of the acid set hydrogel was washed at 80° C. with pH 10 ammonia water at a rate of 100 ml./min. for 24 hours.

A portion of the intermediate density hydrogel was dried in a forced draft oven at 150° C. at 3 cu. ft./min. air flow for 17 hours. The gel was finished by activating at 200° C. for 3 hours.

The surface area of the product was determined by the well-known Brunauer-Emmett-Teller method while the pore volume was measured by total water adsorption. The results for Sample 1 are listed in Table A.

EXAMPLE II

The following example demonstrates the process of this invention for increasing the pore volume of intermediate density hydrogel.

One thousand grams of intermediate density hydrogel were washed with 1% $H_2SO_4$ solution for one hour to neutralize the ammonia at 100 ml./min. followed by a pH 3.0 $H_2SO_4$ wash for another hour at ambient temperature. Both washes were conducted at a rate of 100 ml./min.

After being dried at 150° C. for 17 hours and activated at 200° C. for 3 hours, the surface properties were determined. The results for Sample 2 are shown in Table A.

EXAMPLE III

In this example, the intermediate density silica is prepared in the exact manner as illustrated in Example I except that the acid-set hydrogel was washed at 80° C. with pH 9 ammonia water. The surface properties of the dried and activated product are listed in Table A as Sample 3.

EXAMPLE IV

One thousand grams of the intermediate density hydrogel formed in Example III were acidified in the same manner as in Example II. After drying and activating, the surface area and pore volume were measured. These results for Sample 4 are listed in Table A.

TABLE A

| Sample No. | 1 | 2 | 3 | 4 |
|---|---|---|---|---|
| Surface area (m.²/g.) | 347 | 337 | 492 | 499 |
| Pore volume (cc./g.) | 0.95 | 1.20 | 0.87 | 1.25 |

As can be seen from the results in Table A, Samples 1 and 2 show a 26% increase in pore volume while Samples 3 and 4 indicate an increase of 44%. It can easily be concluded that the process of this invention is an effective method for increasing the pore volume of an intermediate density silica hydrogel to the extent necessary to provide an optimum pore volume for a particular use of the gel.

I claim:

1. A process for increasing the pore volume of an intermediate density silica gel comprising:
   (a) preparing a silica hydrogel by gelation of a sodium silicate solution;
   (b) treating said hydrogel with a solution of ammonia;
   (c) neutralizing the ammonia in said base treated gel with a solution of a mineral acid to a pH of about 1.0 to 3.0;
   (d) washing said gel with acidulated water to remove soluble impurities while maintaining a pH of about 3; and
   (e) drying, activating, and recovering the intermediate density gel product.

2. The process according to claim 1 wherein the mineral acid is sulfuric acid.

3. The process according to claim 1 wherein the ammonia treatment is carried out at a pH of about 8 to 10.

4. The process according to claim 2 wherein the acid concentration is about 1% by weight.

References Cited

UNITED STATES PATENTS

| 2,324,066 | 7/1943 | Connolly | 252—45 X |
| 2,699,376 | 1/1955 | Hay | 23—182 |
| 3,095,384 | 6/1963 | Jenkins et al. | 252—451 |
| 3,146,076 | 8/1964 | Talvenheimo | 252—451 X |
| 3,243,262 | 3/1966 | Carr et al. | 23—182 |
| 3,313,739 | 4/1967 | Acker | 252—451 |

DANIEL E. WYMAN, Primary Examiner

C. F. DEES, Assistant Examiner

U.S. Cl. X.R.

23—182